(12) United States Patent
Huang et al.

(10) Patent No.: US 11,509,597 B2
(45) Date of Patent: Nov. 22, 2022

(54) DATA TRANSMISSION METHOD AND DEVICE

(71) Applicant: HUAWEI TECHNOLOGIES CO., LTD., Guangdong (CN)

(72) Inventors: Zhigang Huang, Grenoble (FR); Xijin Tan, Shenzhen (CN); Xiaoyang Qu, Nanjing (CN); Jian Chen, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/211,466

(22) Filed: Mar. 24, 2021

(65) Prior Publication Data
US 2021/0211390 A1 Jul. 8, 2021

Related U.S. Application Data

(63) Continuation of application No. PCT/CN2019/105260, filed on Sep. 11, 2019.

(30) Foreign Application Priority Data

Sep. 25, 2018 (CN) .......................... 201811117085.6

(51) Int. Cl.
*H04L 47/6295* (2022.01)
*H04L 47/56* (2022.01)
(Continued)

(52) U.S. Cl.
CPC .......... *H04L 47/6295* (2013.01); *H04L 47/56* (2013.01); *H04W 28/0289* (2013.01); *H04W 28/14* (2013.01); *H04W 84/12* (2013.01)

(58) Field of Classification Search
CPC ..... H04L 47/6295; H04L 47/56; H04L 45/16; H04L 47/34; H04L 45/22; H04W 28/0289;
(Continued)

(56) References Cited

U.S. PATENT DOCUMENTS 7,751,404 B2 * 7/2010 Pullen ................. H04L 49/9094
370/420
9,094,856 B1 7/2015 Tian et al.
(Continued)

FOREIGN PATENT DOCUMENTS

CN 101541037 A 9/2009
CN 101547469 A 9/2009
(Continued)

OTHER PUBLICATIONS

IEEE Std 802.11—2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.
(Continued)

*Primary Examiner* — Mohamed A Kamara
(74) *Attorney, Agent, or Firm* — Womble Bond Dickinson (US) LLP

(57) ABSTRACT

Embodiments of the application provide a data transmission method and a device. A sending device periodically obtains a first packet sequence number and a second packet sequence number. The first packet sequence number is a maximum value in packet sequence numbers respectively corresponding to packets that belong to a first data flow and that are received by a receiving device through a first data channel in a statistics period. The second packet sequence
(Continued)

number is a maximum value in packet sequence numbers respectively corresponding to packets that belong to the first data flow and that are received by the receiving device through a second data channel in the statistics period. The sending device updates a packet cache queue of: the first data channel, the second data channel, or both the first and the second data channels, based on the first packet sequence number and the second packet sequence number.

18 Claims, 7 Drawing Sheets

(51) Int. Cl.
*H04W 28/02* (2009.01)
*H04W 28/14* (2009.01)
*H04W 84/12* (2009.01)

(58) Field of Classification Search
CPC ..... H04W 28/14; H04W 84/12; H04W 28/02; H04W 28/085
See application file for complete search history.

(56) References Cited

U.S. PATENT DOCUMENTS 9,125,083 B2 * 9/2015 Townend .............. H04L 1/0009
2004/0223452 A1 * 11/2004 Santos .................... H04L 47/10
370/229
2013/0077501 A1 3/2013 Krishnaswamy et al.
2016/0366008 A1 12/2016 Zeng et al.
2018/0183718 A1 * 6/2018 Xie ....................... H04L 47/263

FOREIGN PATENT DOCUMENTS

| | | |
|---|---|---|
| CN | 104954248 A | 9/2015 |
| CN | 105656798 A | 6/2016 |
| CN | 105812415 A | 7/2016 |
| CN | 106027413 A | 10/2016 |
| CN | 106330414 A | 1/2017 |
| CN | 106572013 A | 4/2017 |
| CN | 108234338 A | 6/2018 |
| CN | 108512708 A | 9/2018 |
| JP | 2015097349 A | 5/2015 |
| WO | 0223833 A2 | 3/2002 |

OTHER PUBLICATIONS

Chlumsky Petr et al: "Delay analysis of data transmission system with channel coding", 2014 Elektro, IEEE, May 19, 2014, XP032614279, total 5 pages.

R3-122737, Ericsson, Specification cleanup before freeze, 3GPP TSG-RAN WG3 Meeting #78, New Orleans, USA, Nov. 12-16, 2012, total 1159 pages.

* cited by examiner

DATA TRANSMISSION METHOD AND DEVICE

CROSS-REFERENCE TO RELATED APPLICATIONS

This application is a continuation of International Application No. PCT/CN2019/105260, filed on Sep. 11, 2019, which claims priority to Chinese Patent Application No. 201811117085.6, filed on Sep. 25, 2018. The disclosures of the aforementioned applications are hereby incorporated by reference in their entireties.

TECHNICAL FIELD

Embodiments of the application relate to the field of communications technologies, and in particular, to a data transmission method and a device.

BACKGROUND

A Wireless Local Area Network (WLAN) technology is a common wireless communications technology, and is widely applied to terminal devices such as a mobile phone, a tablet computer, and a notebook computer. A communications standard widely used in the WLAN technology is the institute of electrical and electronics engineers (IEEE) 802.11 protocol standard. Different protocol standards support different frequency bands. For example, 802.11g works on a 2.4 GHz frequency band, 802.11ac works on a 5 GHz frequency band, and 802.11n may work on the 2.4 GHz frequency band or the 5 GHz frequency band.

Currently, a communications device supporting the WLAN technology may include a plurality of WLAN chips, and may simultaneously send or receive data by using different WLAN chips. For example, the communications device includes two WLAN chips, one WLAN chip works on the 2.4G frequency band, and the other WLAN chip works on the 5G frequency band. When signal quality of each of two WLAN links of two communication parties is very good and the links are both relatively idle, a packet transmission delay on each of the two links is relatively low. A receiver receives a packet with a lower delay, and discards a same packet that arrives later on the other link. When signal quality of one of the two WLAN links of the two communication parties is relatively poor or severe interference exists on the link, a packet transmission delay on the link is very high. A packet transmission delay on the other link with better signal quality or less interference is relatively low. The receiver receives the packet on the link with better signal quality or less interference.

The receiver always selects a packet on a link with a lower delay. Consequently, a quantity of invalid packets on a slow link increases, network congestion increases, and data transmission performance over the two links deteriorates.

SUMMARY

Embodiments of the application provide a data transmission method and a device, to improve data transmission efficiency and performance.

An embodiment of the application provides a data transmission method. A sending device periodically obtains a first packet sequence number and a second packet sequence number. The first packet sequence number is a maximum value in packet sequence numbers respectively corresponding to packets that belong to a first data flow and that are received by a receiving device through a first data channel between the sending device and the receiving device in a statistics period, the second packet sequence number is a maximum value in packet sequence numbers respectively corresponding to packets that belong to the first data flow and that are received by the receiving device through a second data channel between the sending device and the receiving device in the statistics period, at least one packet of the first data flow is sent on both the first data channel and the second data channel, and the packet sequence number is used to indicate a ranking sequence of a corresponding packet in the first data flow. In an embodiment, the sending device updates packet cache queues of the first data channel and the second data channel based on the first packet sequence number and the second packet sequence number. In an embodiment, the sending device updates a packet cache queue of the first data channel based on the first packet sequence number and the second packet sequence number. In an embodiment, the sending device updates a packet cache queue of the second data channel based on the first packet sequence number and the second packet sequence number.

In an embodiment, at least one packet of a same data flow is transmitted through the two data channels, and a maximum value of packet sequence numbers of packets that are of the same data flow and that are separately received by the receiving device through the two data channels is periodically obtained, so that at least one of the packet cache queues of the first data channel and the second data channel can be updated based on the first packet sequence number and the second packet sequence number. Because the packet cache queue of the data channel is dynamically adjusted, data transmission efficiency and performance are improved, and a data transmission delay is reduced.

In an embodiment, that the sending device updates packet cache queues of the first data channel and the second data channel, a packet cache queue of the first data channel, or a packet cache queue of the second data channel based on the first packet sequence number and the second packet sequence number may include: if a difference between the first packet sequence number and the second packet sequence number is greater than a preset threshold, the sending device updates the packet cache queues of the first data channel and the second data channel, a packet cache queue of the first data channel, or a packet cache queue of the second data channel based on the first packet sequence number and the second packet sequence number, In an embodiment, frequent update of the packet cache queue of the data channel is avoided, and data transmission efficiency and performance are improved.

In an embodiment, that the sending device updates packet cache queues of the first data channel and the second data channel, a packet cache queue of the first data channel, or a packet cache queue of the second data channel based on the first packet sequence number and the second packet sequence number may include: if the first packet sequence number is greater than the second packet sequence number, the sending device deletes, from the packet cache queue of the second data channel, a packet that is in the first data flow and whose packet sequence number is less than or equal to the first packet sequence number.

In an embodiment, a packet in a packet cache queue of a slow data channel may be deleted, so that the two data channels are forcibly aligned, thereby avoiding sending of an invalid packet on the slow data channel. Synchronous sending on the two data channels reduces a packet transmission delay.

In an embodiment, that the sending device updates packet cache queues of the first data channel and the second data channel, a packet cache queue of the first data channel, or a packet cache queue of the second data channel based on the first packet sequence number and the second packet sequence number may include: if the first packet sequence number is greater than the second packet sequence number, and there is a target packet in the packet cache queue of the second data channel, where a quantity of times that the sending device attempts to send the target packet on the first data channel reaches a preset maximum quantity of retransmissions, the sending device deletes, from the packet cache queue of the second data channel, a packet that is in the first data flow other than the target packet and whose packet sequence number is less than or equal to the first packet sequence number.

In an embodiment, when a packet in a packet cache queue of a slow data channel is deleted, a packet that fails to be transmitted on a fast data channel is retained, so that the packet can continue to be sent on the slow data channel, thereby improving data transmission efficiency and reducing a packet loss rate.

In an embodiment, that a sending device periodically obtains a first packet sequence number and a second packet sequence number may include: For any one of the first data channel and the second data channel, the sending device receives, in the statistics period through the data channel, an acknowledgement message sent by the receiving device. The acknowledgement message is used to indicate a packet received by the receiving device through the data channel. The sending device obtains, based on the acknowledgement message, a packet sequence number indicating the received packet. The sending device obtains the first packet sequence number or the second packet sequence number based on the packet sequence number indicating the received packet.

In an embodiment, the method may further include: the sending device obtains, based on the acknowledgement message, a flow identifier indicating a data flow to which the received packet belongs. That the sending device updates packet cache queues of the first data channel and the second data channel, a packet cache queue of the first data channel, or a packet cache queue of the second data channel based on the first packet sequence number and the second packet sequence number includes: when a flow identifier corresponding to the first packet sequence number is the same as a flow identifier corresponding to the second packet sequence number, the sending device updates the packet cache queues of the first data channel and the second data channel, a packet cache queue of the first data channel, or a packet cache queue of the second data channel based on the first packet sequence number and the second packet sequence number.

Optionally, in an embodiment, the first data channel is a first WLAN link, and the second data channel is a second WLAN link.

Optionally, in an embodiment, the method may further include: the sending device obtains a to-be-sent packet. If it is determined that the to-be-sent packet is sent on both the first data channel and the second data channel, the sending device separately places the to-be-sent packet in the packet cache queues of the first data channel and the second data channel.

In an embodiment, if there is one data flow to which the to-be-sent packet that is sent on both the first data channel and the second data channel belongs, that the sending device separately places the to-be-sent packet in the packet cache queues of the first data channel and the second data channel includes: The sending device sets a priority of the to-be-sent packet to be higher than a priority of a packet of a data flow other than the data flow to which the to-be-sent packet belongs. The sending device separately places the to-be-sent packet in the packet cache queues of the first data channel and the second data channel based on the priority of the to-be-sent packet.

In an embodiment, packets of a unique data flow transmitted on the two data channels are set to have a highest priority, so that the packets of the data flow can be located in a same queue, thereby facilitating subsequent update of the packet cache queue of the data channel, improving queue adjustment efficiency, and further improving data transmission efficiency and performance.

An embodiment of the application provides a data transmission method, including: A sending device periodically obtains adjustment reference information. The adjustment reference information is used to indicate a congestion status of any one of two data channels between the sending device and a receiving device over which a packet is sent, or is used to indicate a transmission rate of a data flow to be sent by the sending device to the receiving device. The sending device adjusts a to-be-sent packet set of at least one data channel based on the adjustment reference information. A union set of to-be-sent packet sets respectively corresponding to the two data channels is a first packet set, the first packet set includes all to-be-sent packets of the first data flow, and an intersection set of the to-be-sent packet sets respectively corresponding to the two data channels is non-empty.

In an embodiment, the adjustment reference information is periodically obtained, so that a data sending status can be obtained. Further, a to-be-sent packet set of a multi-transmit data flow on the at least one data channel may be adjusted based on the adjustment reference information, to improve data transmission adaptability, efficiency, and performance.

In an embodiment, the adjustment reference information includes an evaluation value corresponding to each data channel, and the evaluation value is any one of the following: queue utilization X of a queue corresponding to the first data flow; a normalized value Y of a link delay, where the normalized value Y of the link delay is used to indicate a ratio of the link delay to a preset maximum link delay, and the link delay is a link delay of the data channel, a link delay of the queue corresponding to the first data flow on the data channel, or a link delay of the first data flow on the data channel; and $\alpha \times X + \beta \times Y$, where $\alpha$ is a weight value corresponding to the queue utilization, and $\beta$ is a weight value corresponding to the normalized value Y of the link delay.

According to the data transmission method provided in an embodiment, queue utilization, a link delay, or both the queue utilization and the link delay may dynamically reflect a congestion status of a data channel. The sending device evaluates congestion statuses of the two data channels based on indicators such as queue utilization, link delays, or the queue utilization and the link delays respectively corresponding to the data channels, and for a data channel in a congested state, fewer packets can be sent, to improve data transmission adaptability, efficiency, and performance.

In an embodiment, that the sending device adjusts a to-be-sent packet set of at least one data channel based on the adjustment reference information may include: For any one of evaluation values respectively corresponding to the two data channels, if the evaluation value is less than a first threshold, the sending device adjusts a to-be-sent packet set of a data channel corresponding to the evaluation value to the first packet set; or if the evaluation value is greater than the first threshold, the sending device adjusts, based on the evaluation value, a to-be-sent packet set of a data channel corresponding to the evaluation value.

In an embodiment, the adjustment reference information includes the transmission rate of the data flow to be sent by the sending device to the receiving device. That the sending device adjusts a to-be-sent packet set of at least one data channel based on the adjustment reference information includes: If the transmission rate is less than a second threshold, the sending device adjusts a to-be-sent packet set of a second data channel to the first packet set; or if the transmission rate is greater than the second threshold, the sending device adjusts a to-be-sent packet set of a second data channel based on a ratio of the second threshold to the adjustment reference information. The second threshold is determined based on a rate of the second data channel that is negotiated between the receiving device and the sending device.

In an embodiment, it can be ensured that all packets of a data flow can be sent on a fast data channel, and only a to-be-sent packet set of a slow data channel is adjusted based on the adjustment reference information, to improve data transmission adaptability, efficiency, and performance.

An embodiment of the application provides a sending device, including: an obtaining module, configured to periodically obtain a first packet sequence number and a second packet sequence number, where the first packet sequence number is a maximum value in packet sequence numbers respectively corresponding to packets that belong to a first data flow and that are received by a receiving device through a first data channel between the sending device and the receiving device in a statistics period, the second packet sequence number is a maximum value in packet sequence numbers respectively corresponding to packets that belong to the first data flow and that are received by the receiving device through a second data channel between the sending device and the receiving device in the statistics period, at least one packet of the first data flow is sent on both the first data channel and the second data channel, and the packet sequence number is used to indicate a ranking sequence of a corresponding packet in the first data flow; and a processing module, configured to update packet cache queues a of the first data channel and the second data channel, a packet cache queue of the first data channel, or a packet cache queue of the second data channel based on the first packet sequence number and the second packet sequence number.

In an embodiment, the processing module is configured to: if a difference between the first packet sequence number and the second packet sequence number is greater than a preset threshold, update the packet cache queues of the first data channel and the second data channel, a packet cache queue of the first data channel, or a packet cache queue of the second data channel based on the first packet sequence number and the second packet sequence number.

In an embodiment, the processing module is configured to: if the first packet sequence number is greater than the second packet sequence number, delete, from the packet cache queue of the second data channel, a packet that is in the first data flow and whose packet sequence number is less than or equal to the first packet sequence number.

In an embodiment, the processing module is configured to: if the first packet sequence number is greater than the second packet sequence number, and there is a target packet in the packet cache queue of the second data channel, where a quantity of times that the sending device attempts to send the target packet on the first data channel reaches a preset maximum quantity of retransmissions, delete, from the packet cache queue of the second data channel, a packet that is in the first data flow other than the target packet and whose packet sequence number is less than or equal to the first packet sequence number.

In an embodiment, the obtaining module is configured to: for any one of the first data channel and the second data channel, receive, in the statistics period through the data channel, an acknowledgement message sent by the receiving device, where the acknowledgement message is used to indicate a packet received by the receiving device through the data channel; obtain, based on the acknowledgement message, a packet sequence number indicating the received packet; and obtain the first packet sequence number or the second packet sequence number based on the packet sequence number indicating the received packet.

In an embodiment, the obtaining module is further configured to: obtain, based on the acknowledgement message, a flow identifier indicating a data flow to which the received packet belongs; and the processing module is configured to: when a flow identifier corresponding to the first packet sequence number is the same as a flow identifier corresponding to the second packet sequence number, update the packet cache queues of the first data channel and the second data channel, a packet cache queue of the first data channel, or a packet cache queue of the second data channel based on the first packet sequence number and the second packet sequence number.

In an embodiment, the first data channel is a first WLAN link, and the second data channel is a second WLAN link.

In an embodiment, the sending device further includes a receiving module. The receiving module is configured to obtain a to-be-sent packet. The processing module is further configured to: if it is determined that the to-be-sent packet is sent on both the first data channel and the second data channel, separately place the to-be-sent packet in the packet cache queues of the first data channel and the second data channel.

In an embodiment, if there is one data flow to which the to-be-sent packet that is sent on both the first data channel and the second data channel belongs, the processing module is configured to: set a priority of the to-be-sent packet to be higher than a priority of a packet of a data flow other than the data flow to which the to-be-sent packet belongs; and separately place the to-be-sent packet in the packet cache queues of the first data channel and the second data channel based on the priority of the to-be-sent packet.

An embodiment of the application provides a sending device, including: an obtaining module, configured to periodically obtain adjustment reference information, where the adjustment reference information is used to indicate a congestion status of any one of two data channels between the sending device and a receiving device over which a packet is sent, or is used to indicate a transmission rate of a data flow to be sent by the sending device to the receiving device; and a processing module, configured to adjust a to-be-sent packet set of at least one data channel based on the adjustment reference information. A union set of to-be-sent packet sets respectively corresponding to the two data channels is a first packet set, the first packet set includes all to-be-sent packets of the first data flow, and an intersection set of the to-be-sent packet sets respectively corresponding to the two data channels is non-empty.

In an embodiment, the adjustment reference information includes an evaluation value corresponding to each data channel, and the evaluation value is any one of the following: queue utilization X of a queue corresponding to the first data flow; a normalized value Y of a link delay, where the normalized value Y of the link delay is used to indicate a ratio of the link delay to a preset maximum link delay, and the link delay is a link delay of the data channel, a link delay of the queue corresponding to the first data flow on the data channel, or a link delay of the first data flow on the data channel; and α×X+β×Y, where α is a weight value corresponding to the queue utilization, and β is a weight value corresponding to the normalized value Y of the link delay.

In an embodiment, the processing module is configured to: for any one of evaluation values respectively corresponding to the two data channels, if the evaluation value is less than a first threshold, adjust a to-be-sent packet set of a data channel corresponding to the evaluation value to the first packet set; or if the evaluation value is greater than the first threshold, adjust, based on the evaluation value, a to-be-sent packet set of a data channel corresponding to the evaluation value.

In an embodiment, the adjustment reference information includes the transmission rate of the data flow to be sent by the sending device to the receiving device, and a to-be-sent packet set of a first data channel is the first packet set. The processing module is configured to: if the transmission rate is less than a second threshold, adjust a to-be-sent packet set of a second data channel to the first packet set; or if the transmission rate is greater than the second threshold, adjust a to-be-sent packet set of a second data channel based on a ratio of the second threshold to the adjustment reference information. The second threshold is determined based on a rate of the second data channel that is negotiated between the receiving device and the sending device.

An embodiment of the application provides a sending device. The sending device includes a processor, a memory, and a transceiver. The memory is configured to store instructions, the transceiver is configured to communicate with another device, and the processor is configured to execute the instructions stored in the memory, so that the sending device performs the data transmission methods provided in embodiments described herein.

An embodiment of the application provides a storage medium, including a readable storage medium and a computer program. The computer program is used to implement the data transmission methods provided in embodiments described herein.

An embodiment of the application provides a program product. The program product includes a computer program (that is, an executable instruction), and the computer program is stored in a readable storage medium. A processor may read the computer program from the readable storage medium, and the processor executes the computer program to perform the data transmission methods provided in embodiments described herein.

According to the data transmission method and the device that are provided in the embodiments of the application, the sending device periodically obtains the first packet sequence number and the second packet sequence number. The sending device updates the packet cache queues of the first data channel and the second data channel, a packet cache queue of the first data channel, or a packet cache queue of the second data channel based on the first packet sequence number and the second packet sequence number. Because a packet of a same data flow may be transmitted through the two data channels at different speeds, a maximum value of packet sequence numbers of the packets that are of a same data flow and that are separately received by the receiving device through the two data channels is periodically obtained, so that the packet cache queue of the data channel can be dynamically adjusted, thereby improving data transmission efficiency and performance.

DESCRIPTION OF EMBODIMENTS

Figure 1:
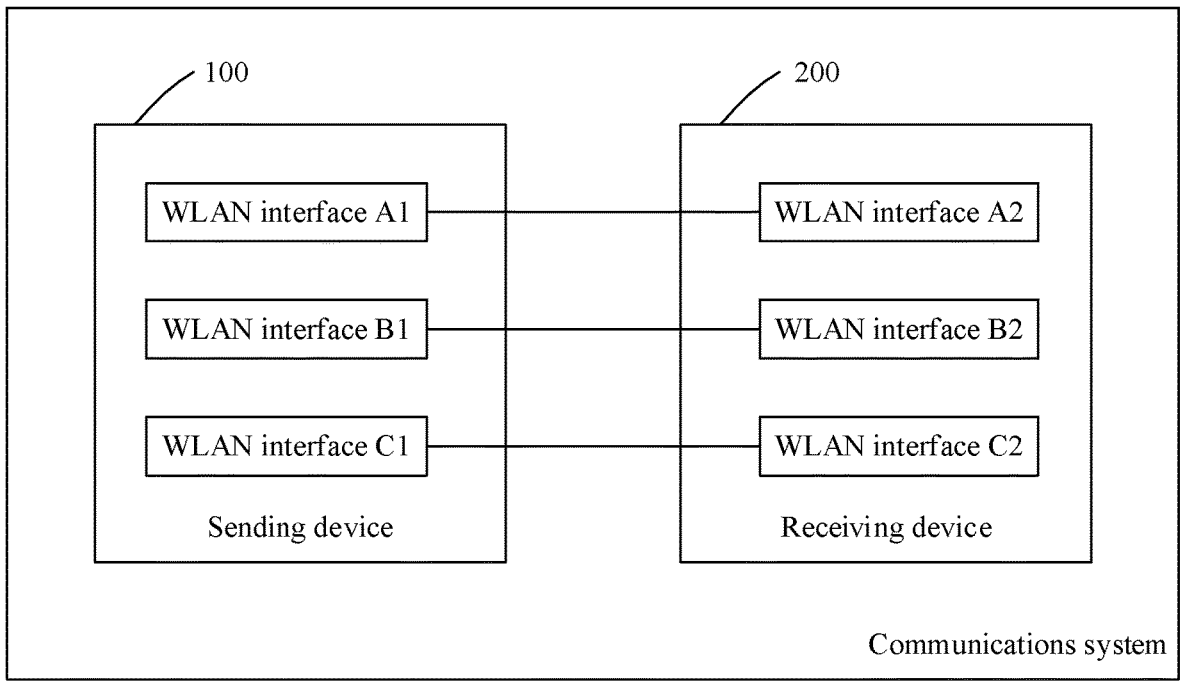
FIG. 1 is an architectural diagram of a communications system according to an embodiment of the application.

FIG. 1 is an architectural diagram of a communications system according to an embodiment of the application.

As shown in FIG. 1, the communications system may include a sending device 100 and a receiving device 200. There are at least two data channels between the sending device 100 and the receiving device 200. An embodiment sets no limitation on a quantity of data channels, and types, communication frequency bands, and followed communications protocols of the data channels. Optionally, the data channel may be a WLAN link, and the followed communications protocol may be the institute of electrical and electronics engineers (IEEE) 802.11 protocol. Optionally, the sending device 100 and the receiving device 200 may negotiate with each other about a communication rate for the data channel.

For example, in FIG. 1, the data channel may be a WLAN link. The quantity of data channels is 3. The sending device 100 includes a WLAN interface A1, a WLAN interface B1, and a WLAN interface C1. The receiving device 200 includes a WLAN interface A2, a WLAN interface B2, and a WLAN interface C2. A communication frequency band and a communications protocol of the WLAN interface A1 are the same as those of the WLAN interface A2, and the WLAN interface A1 and the WLAN interface A2 form a data channel A. Similarly, the WLAN interface B1 and the WLAN interface B2 form a data channel B, and the WLAN interface C1 and the WLAN interface C2 form a data channel C. Optionally, communication frequency bands of the WLAN interface A1 and the WLAN interface A2 may be 2.4 G, and communications protocols of the WLAN interface A1 and the WLAN interface A2 may be the 802.11g protocol. Communication frequency bands of the WLAN interface B1 and the WLAN interface B2 may be 2.4G, and communications protocols of the WLAN interface B1 and the WLAN interface B2 may be the 802.11n protocol. Communication frequency bands of the WLAN interface C1 and the WLAN interface C2 may be 5G, and communications protocols of the WLAN interface C1 and the WLAN interface C2 may be the 802.11ac protocol.

In an embodiment of the application, the sending device 100 may send a packet of at least one data flow to the receiving device 200. There is at least one data flow, and at least one packet of the data flow needs to be sent on at least two data channels. In an embodiment of the application, if all packets of a data flow need to be sent on only one data channel, the data flow may be referred to as a single-transmit data flow. If at least one packet of a data flow needs to be sent on at least two data channels, the data flow may be referred to as a multi-transmit data flow. For a multi-transmit data flow, a union set of to-be-sent packet sets respectively corresponding to the at least two data channels is a first packet set. The first packet set includes all to-be-sent packets of the multi-transmit data flows. An intersection set of the to-be-sent packet sets respectively corresponding to the at least two data channels is non-empty.

For example, in FIG. 1, the sending device 100 may send three data flows to the receiving device 200, and the three data flows are respectively marked as a data flow 1, a data flow 2, and a data flow 3. The data flow 1 is a single-transmit data flow. The data flow 2 and the data flow 3 are multi-transmit data flows. For the data flow 1, the sending device 100 may send a packet of the data flow 1 to the receiving device 200 through the data channel A. Correspondingly, the receiving device 200 may receive, through the data channel A, the packet that is of the data flow 1 and that is sent by the sending device 100. For the data flow 2, the sending device 100 may separately send a packet of the data flow 2 to the receiving device 200 through the data channel A, the data channel B, and the data channel C. Correspondingly, the receiving device 200 may separately receive, through the data channel A, the data channel B, and the data channel C, the packet that is of the data flow 2 and that is sent by the sending device 100. For the data flow 3, the sending device 100 may separately send a packet of the data flow 3 to the receiving device 200 through the data channel B and the data channel C. Correspondingly, the receiving device 200 may separately receive, through the data channel B and the data channel C, the packet that is of the data flow 3 and that is sent by the sending device 100.

For example, it is assumed that the data flow 3 includes 100 packets, which are sequentially marked as a packet 1 to a packet 100. In an example, a to-be-sent packet set corresponding to the data channel C includes the packet 1 to the packet 100, and a to-be-sent packet set corresponding to the data channel B includes the packet 1 to the packet 100. In another example, a to-be-sent packet set corresponding to the data channel C includes the packet 1 to the packet 100, and a to-be-sent packet set corresponding to the data channel B includes the packet 1 to the packet 50. In still another example, a to-be-sent packet set corresponding to the data channel C includes the packet 1 to the packet 90, and a to-be-sent packet set corresponding to the data channel B includes the packet 80 to the packet 100.

It should be noted that, in an embodiment of the application, for each data channel, meanings of "a packet that needs to be sent by the sending device", "a packet sent by the sending device or a packet that has been sent by the sending device", and "a packet received by the receiving device" are different.

"A packet that needs to be sent by the sending device" means that the packet may be placed in a packet cache queue of a data channel and waits to be sent by the sending device through the data channel, but the sending device does not necessarily send the packet, which is related to an actual status of the data channel, for example, a bandwidth, a congestion status, an interference status, and a signal quality status of the data channel. "A packet sent by the sending device or a packet that has been sent by the sending device" is a packet that has been sent by the sending device through a data channel. "A packet received by the receiving device" is a packet received by the receiving device through a data channel. The receiving device may or may not receive the packet sent by the sending device.

The foregoing data flow 3 is still used as an example for description.

For the data channel B, "a packet that needs to be sent by the sending device" may be the packet 1 to the packet 100, "a packet sent by the sending device or a packet that has been sent by the sending device" may be the packet 1 to the packet 40, and "a packet received by the receiving device" may be the packet 1 to the packet 30. For the data channel C, "a packet that needs to be sent by the sending device" may be the packet 1 to the packet 100, "a packet sent by the sending device or a packet that has been sent by the sending device" may be the packet 1 to the packet 70, and "a packet received by the receiving device" may be the packet 1 to the packet 50 or the packet 60 to the packet 70.

It should be noted that an embodiment of the application sets no limitation on quantities and types of the sending device 100 and the receiving device 200. In some embodiments, the sending device 100 and the receiving device 200 may also be referred to as communications devices.

Optionally, the sending device 100 or the receiving device 200 may include a home gateway (HGW), an access point (AP), a terminal or station (STA) and another device having a wireless connection function, for example, a mobile phone, a tablet computer, a handheld device, a vehicle-mounted device, a wearable device, or a computing device, user equipment (UE), a mobile station (MS), and a terminal in various forms, and the like. This is not limited in an embodiment of the application.

Figure 2A:
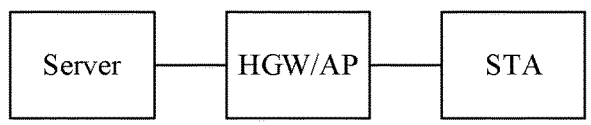
FIG. 2A is a schematic diagram of an application scenario according to an embodiment of the application.

For example, FIG. 2A is a schematic diagram of an application scenario according to an embodiment of the application.

As shown in FIG. 2A, in a home network scenario, communications devices may include an HGW/AP and a STA. The HGW/AP may be connected to a server wiredly, for example, by using a copper line or an optical fiber, so that the HGW/AP accesses the internet. The HGW/AP may be connected to the STA wirelessly, for example, by using a WiFi network. There may be a plurality of WLAN links between the HGW/AP and the STA.

In an uplink direction, the HGW may access the internet by using a technology such as a digital subscriber line (DSL) or a gigabit passive optical network (GPON)/Ethernet passive optical network (EPON). In a downlink direction, the HGW may provide network access for the STA by using an Ethernet technology or a WiFi technology. In an uplink direction, the AP may access the internet through the Ethernet. In a downlink direction, the AP may provide network access for the STA by using an Ethernet technology or a WiFi technology.

Figure 2B:
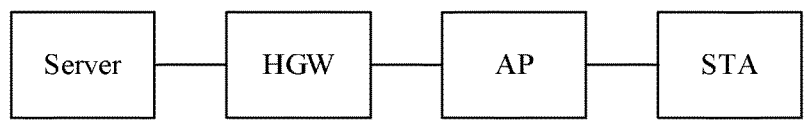
FIG. 2B is a schematic diagram of another application scenario according to an embodiment of the application.

For example, FIG. 2B is a schematic diagram of another application scenario according to an embodiment of the application.

As shown in FIG. 2B, in a home network scenario, communications devices may include an HGW, an AP, and a STA. The HGW may be connected to a server wiredly, so that the HGW accesses the internet. The HGW may be wirelessly connected to the AP and the AP may be wirelessly connected to the STA, for example, by using a WiFi network. To expand coverage of a WiFi network, a plurality of APs can be deployed. There may be a plurality of WLAN links between the HGW and the AP and there may be a plurality of WLAN links between the AP and the STA.

For example, an embodiment of the application may be further applied between an AP and a STA, or APs in an enterprise scenario.

The following uses an HGW as an example to describe a hardware structure of the sending device or the receiving device provided in an embodiment of the application.

Figure 3:
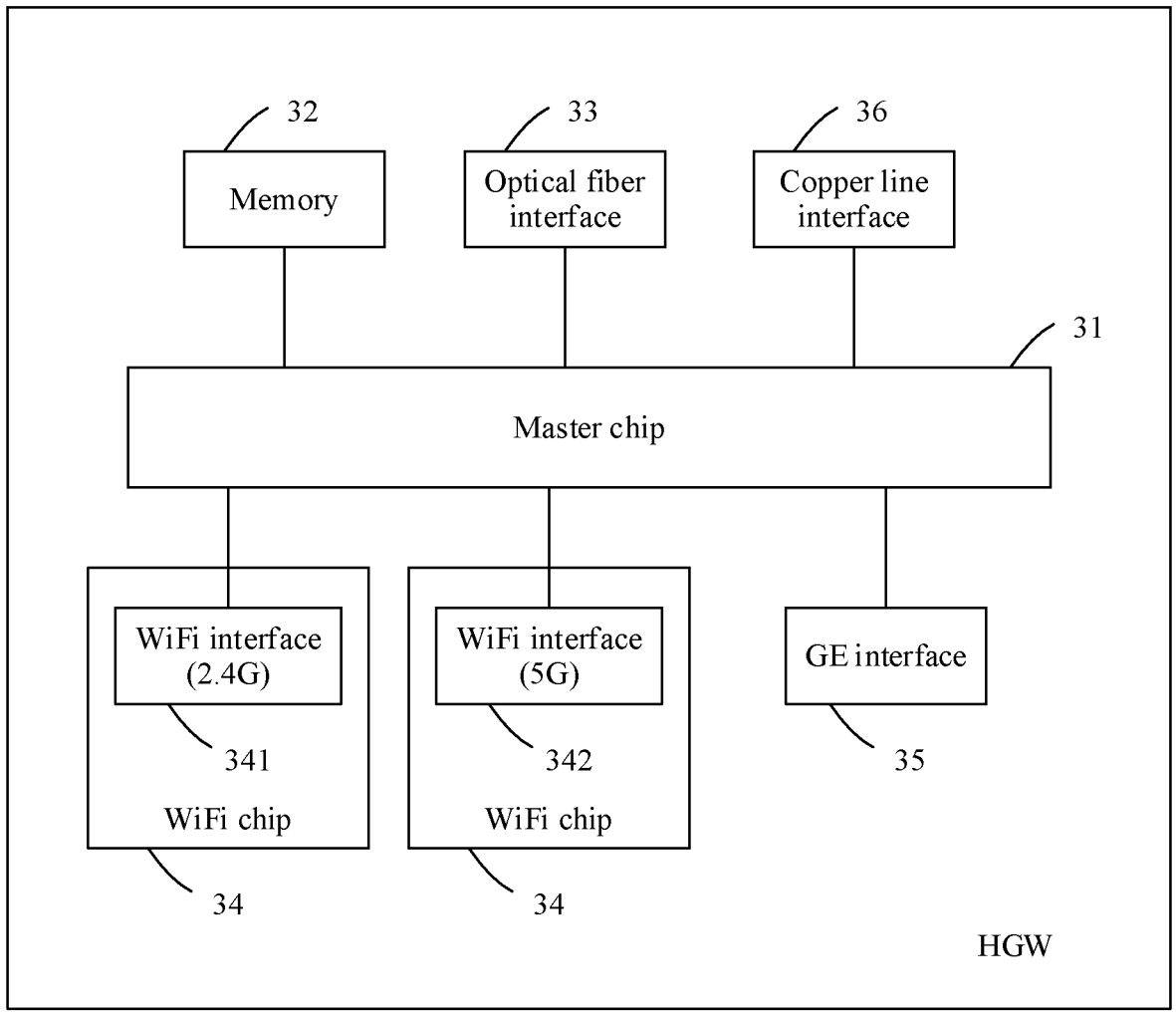
FIG. 3 is a schematic diagram of a hardware architecture of an HGW according to an embodiment of the application.

FIG. 3 is a schematic diagram of a hardware architecture of an HGW according to an embodiment of the application.

As shown in FIG. 3, the hardware structure of the HGW may include a master chip 31 and a memory 32, and may further include at least one of the following interfaces: an optical fiber interface 33, a WiFi chip 34, a gigabit Ethernet (GE) interface 35 with a transmission rate of 1000 M, and a copper line interface 36. The WiFi chip 34 may include a WiFi interface. A communication frequency band of a WiFi interface 341 may be 2.4G, and a communication frequency band of a WiFi interface 342 may be 5G.

In FIG. 3, in an uplink direction, the HGW may access the internet by using a GPON/EPON technology through the optical fiber interface 33, or may access the internet by using a DSL technology through the copper line interface 36. In a downlink direction, the HGW may provide network access for the AP or the STA through the WiFi interface 341, the WiFi interface 342, or the GE interface 35. Optionally, a main central processing unit (CPU) and a forwarding chip may be integrated into the master chip 31. The main CPU may be configured to execute a computer program (that is, an executable instruction), to implement functions such as packet forwarding processing and HGW device management. The forwarding chip is configured to perform layer 2 forwarding of a packet by using hardware, to improve forwarding performance and alleviate processing load of the main CPU. The memory 32 may be configured to store data. The data may include the computer program (that is, the executable instruction).

It should be noted that models and implementations of the master chip 31, the main CPU, the forwarding chip, and the WiFi chip 34 are not limited in an embodiment. An implementation of the memory 32 is not limited in an embodiment, for example, a dynamic random access memory (DRAM) memory. Quantities of the optical fiber interface 33, the WiFi chip 34, and the GE interface 35 are not limited in an embodiment. For example, there may be four GE interfaces.

For example, for a hardware structure of an AP to which an embodiment of the application is applicable, refer to the example shown in FIG. 3.

Optionally, in the scenario shown in FIG. 2A, in an uplink direction, the AP may access the internet through the GE interface. In a downlink direction, the AP may communicate with the STA through the WiFi interface or the GE interface. Optionally, in the scenario shown in FIG. 2B, in an uplink direction, the AP may communicate with the HGW through the WiFi interface or the GE interface. In a downlink direction, the AP may communicate with the STA through the WiFi interface or the GE interface.

For example, for a hardware structure of a STA to which an embodiment of the application is applicable, refer to the example shown in FIG. 3.

Optionally, in the scenario shown in FIG. 2A or FIG. 2B, the STA may communicate with the HGW or the AP through the WiFi interface or the GE interface.

The following describes a data sending method in the embodiments of the application. The method may be executed by a sending device.

For example, there are two WLAN links between the sending device and a receiving device, and the two WLAN links may be respectively marked as a first WLAN link and a second WLAN link. A communication frequency band of the first WLAN link may be 2.4G, and a communication frequency band of the second WLAN link may be 5G.

Operation 1: Obtain a to-be-sent packet.

Operation 2: If the to-be-sent packet needs to be sent on the two WLAN links, generate identification information.

In an embodiment, the sending device and the receiving device may determine a multi-transmit data flow through manual configuration or control message exchange. A packet of the multi-transmit data flow can be sent on the two WLAN links.

Optionally, whether the to-be-sent packet needs to be sent on the two WLAN links may be determined by using 5-tuple information of the to-be-sent packet.

Optionally, the 5-tuple information may include a source IP address, a destination IP address, a protocol number, a source port, and a destination port.

Optionally, the identification information may include a packet sequence number. The packet sequence number is used to indicate a ranking sequence of a packet in a data flow to which the packet belongs.

The packet sequence number can be used to determine whether the to-be-sent packet needs to be sent on the two WLAN links.

Optionally, the identification information may further include a flow identifier. The flow identifier is used to uniquely distinguish between different data flows.

In an embodiment, for a multi-transmit data flow, each time the sending device obtains a packet of the multi-transmit data flow, the sending device increases the packet sequence number by 1. For example, the packet sequence number has been marked as 100 currently. For a newly obtained packet of the multi-transmit data flow, a corresponding packet sequence number is 101.

Optionally, the flow identifier may be generated based on the 5-tuple information of the to-be-sent packet.

Optionally, if the to-be-sent packet does not need to be sent on the two WLAN links, the identification information may also be generated.

Optionally, for a non-multi-transmit data flow, both the flow identifier and the packet sequence number in the identification information may be 0.

Optionally, the identification information may be carried in a descriptor of the packet.

The descriptor is a data structure in an IP forwarding process. After a packet is obtained, the packet can be stored in a memory. The descriptor carries basic information of the packet and is processed in a protocol stack layer by layer. In a processing process, only the descriptor is transmitted, and the packet is not transmitted.

Operation 3: Encapsulate the to-be-sent packet.

Optionally, Generic Routing Encapsulation (GRE) may be performed on the to-be-sent packet or a tag header may be added to the to-be-sent packet. For example, a new tag header is added between an Internet Protocol (IP) layer and a Media Access Control (MAC) layer.

Optionally, an encapsulated to-be-sent packet may include the identification information of the to-be-sent packet.

Operation 4: Place the to-be-sent packet in a packet cache queue of a WLAN link.

In an embodiment, the packet cache queue is used to cache a packet sent to the receiving device. If the to-be-sent packet does not need to be sent on the two WLAN links, the to-be-sent packet is placed in a packet cache queue of a WLAN link on which the to-be-sent packet needs to be sent. If the to-be-sent packet needs to be sent on the two WLAN links, the to-be-sent packet is separately placed in packet cache queues of the two WLAN links.

Figure 4:
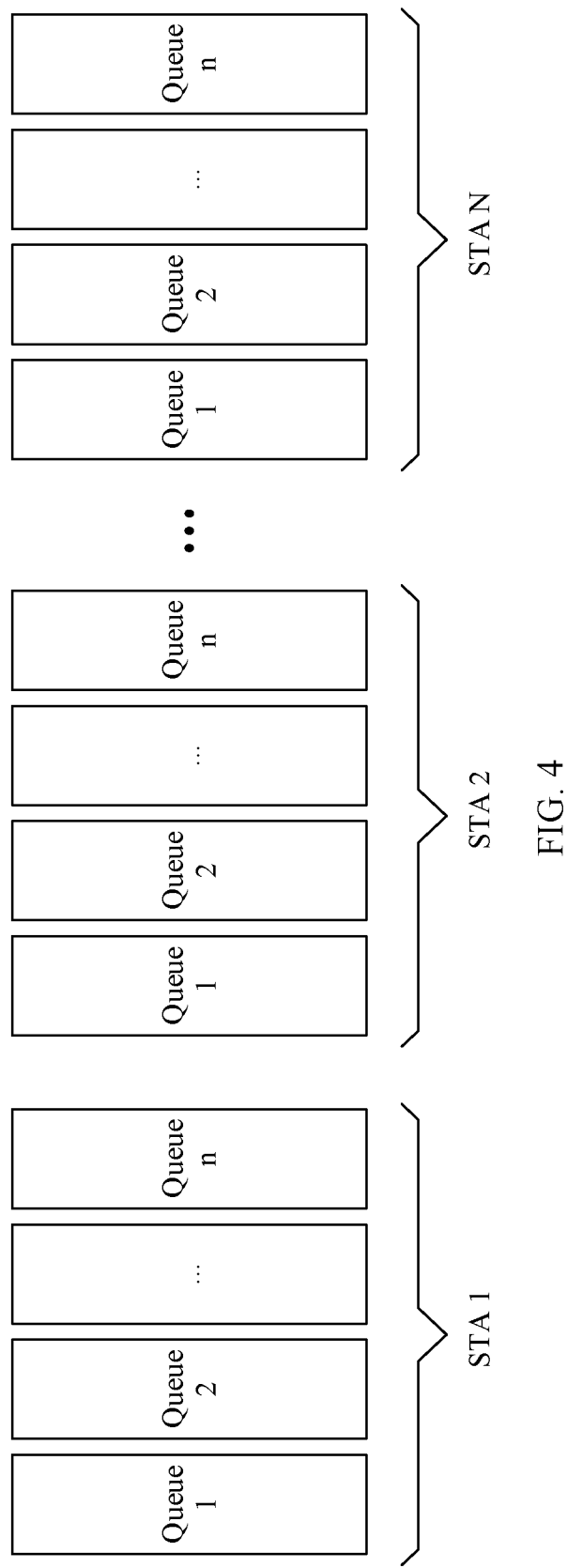
FIG. 4 is a schematic diagram of a packet cache queue according to an embodiment of the application.

The following describes the packet cache queue by using an example with reference to FIG. 4. It is assumed that the sending device is an AP, and the receiving device is a STA.

The AP may communicate with at least one STA. For each WLAN link and each STA, the AP manages a packet cache queue corresponding to the WLAN link and the STA.

For example, the AP communicates with a STA 1 and a STA 2. Packet cache queues managed by the AP may include a packet cache queue corresponding to the first WLAN link and the STA 1, a packet cache queue corresponding to the first WLAN link and the STA 2, a packet cache queue corresponding to the second WLAN link and the STA 1, and a packet cache queue corresponding to the second WLAN link and the STA 2.

FIG. 4 is a schematic diagram of a packet cache queue according to an embodiment of the application, and shows packet cache queues for one WLAN link and different STAs.

As shown in FIG. 4, the AP may communicate with an STA 1 to an STAN. For each STA, the AP may maintain several queues with different priorities, for example, a queue 1 to a queue n. The AP caches packets into different queues based on priorities of the packets.

Optionally, the sending device may set a priority of a packet of a multi-transmit data flow to be higher than a priority of a packet of a non-multi-transmit data flow.

Optionally, priorities of packets of different multi-transmit data flows are different.

The priority of the packet of the multi-transmit data flow is set to be higher, so that the packet is easily placed in the packet cache queue, and queues respectively corresponding to the multi-transmit data flow and the non-multi-transmit data flow are easily distinguished between each other, thereby facilitating queue management.

For example, the AP sends three data flows to the STA 1. A data flow 1 is a single-transmit data flow. A data flow 2 and a data flow 3 are multi-transmit data flows. In an example, priorities of packets of the data flow 2 and the data flow 3 are the same, and are both higher than a priority of a packet of the data flow 1. In another example, a priority of a packet of the data flow 2 is higher than a priority of a packet of the data flow 3, and both the priority of the packet of the data flow 2 and the priority of the packet of the data flow 3 are higher than a priority of a packet of the data flow 1.

For example, the AP sends three data flows to the STA 1. A data flow 1 and a data flow 2 are single-transmit data flows. A data flow 3 is a multi-transmit data flow. In an example, a priority of a packet of the data flow 3 is higher than priorities of packets of the data flow 1 and the data flow 2.

It should be noted that the to-be-sent packet may be placed in the packet cache queue of the WLAN link based on a priority of the descriptor of the packet.

Optionally, the sending device may set a priority of a descriptor of a packet of a multi-transmit data flow to be higher than a priority of a descriptor of a packet of a non-multi-transmit data flow.

Optionally, priorities of descriptors of packets of different multi-transmit data flows are different.

Setting the priority of the packet is similar to setting the priority of the descriptor of the packet. For details, refer to the foregoing description. Details are not described herein again.

Operation 5: Separately send the packet on the two WLAN links based on the packet cache queues of the two WLAN links.

In an embodiment, 802.11 frame format encapsulation, packet aggregation, and the like may be performed on the packet according to the 802.11 protocol, and then the packet is sent to the receiving device by using hardware. After 802.11 frame format encapsulation is performed on each packet according to the 802.11 protocol, each packet has a sequence number generated according to the 802.11 protocol, and the sequence number may be referred to as a WLAN frame sequence number. For a packet of a multi-transmit data flow, there is a correspondence between a WLAN frame sequence number of the packet and a packet sequence number.

The following describes a data receiving method in the embodiments of the application. The method may be executed by a receiving device.

For example, there are two WLAN links between a sending device and the receiving device, and the two WLAN links may be respectively marked as a first WLAN link and a second WLAN link. A communication frequency band of the first WLAN link may be 2.4G, and a communication frequency band of the second WLAN link may be 5G.

Operation 1: Separately receive, through the two WLAN links, a packet sent by the sending device, and separately send a feedback message to the sending device through the two WLAN links.

In an embodiment, after receiving the packet, the receiving device sends the feedback message to the sending device. The sending device may determine, based on the feedback message, packets that are received or packets that are not received by the receiving device. If no packet is received, the sending device can actively initiate retransmission. If a quantity of packet retransmissions exceeds a preset maximum quantity of retransmissions, the sending device may discard sending the packet, and consequently a packet loss is caused.

Optionally, the feedback message may include an acknowledgement message. The acknowledgement message is used to indicate whether the receiving device receives a single packet.

Optionally, the acknowledgement message may include an acknowledgement (ACK) indication.

Optionally, the feedback message may include a group acknowledgement message. The group acknowledgement message is used to indicate packets of a plurality of packets that have been received by the receiving device.

Optionally, the group acknowledgement message may include a start WLAN frame sequence number and K bit indication information, where K is an integer greater than 1. The start WLAN frame sequence number is a WLAN frame sequence number of a packet. Each bit in the K bit indication information is used to indicate whether the receiving device receives K consecutively ranked packets starting from the packet.

Operation 2: Decapsulate the packet. If a packet is sent on the two WLAN links, receive only the packet that arrives earlier, and discard the packet that arrives later on the other WLAN link.

Optionally, a packet sequence number of the packet may be obtained by decapsulating the packet.

It can be determined, based on the packet sequence number of the packet, whether the packet is sent on the two WLAN links.

Optionally, after the packet is decapsulated, a flow identifier of the packet may be generated based on 5-tuple information of the packet.

It should be noted that the sending device and the receiving device may generate the flow identifier of the packet based on the 5-tuple information of the packet by using a same method.

The data transmission method provided in the embodiments of the application is intended to resolve a technical problem that a very good data transmission effect cannot be achieved currently through the two links.

The following uses specific embodiments to describe in detail the technical solutions of the application and how to resolve the foregoing technical problem in the technical solutions of the application. The following several specific embodiments may be combined with each other, and a same or similar concept or process may not be described repeatedly in some embodiments.

For example, in the embodiments of the application, an example in which there are two data channels between the sending device and the receiving device is used for description. Optionally, a first data channel may be a first WLAN link, and a second data channel may be a second WLAN link.

Figure 5:
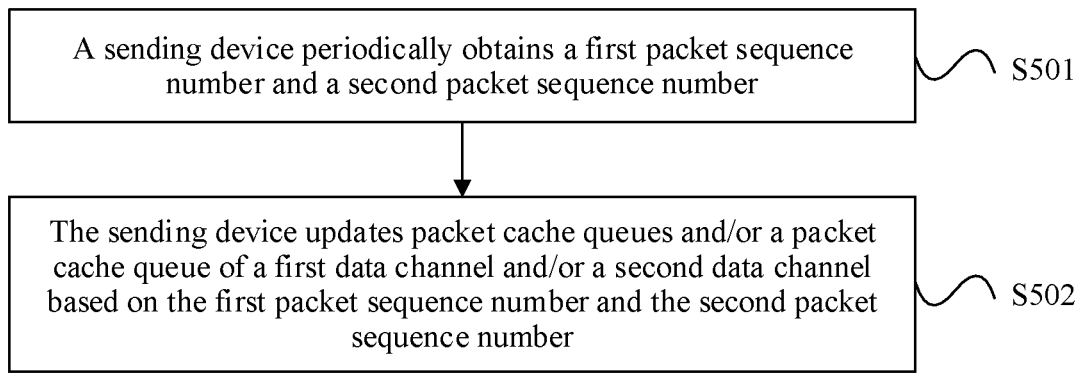
FIG. 5 is a flowchart of a data transmission method according to an embodiment 1 of the application.

FIG. 5 is a flowchart of a data transmission method according to an embodiment 1 of the application. The data transmission method provided in an embodiment may be executed by a sending device. As shown in FIG. 5, the data transmission method provided in an embodiment may include the following operations.

S501. The sending device periodically obtains a first packet sequence number and a second packet sequence number.

The first packet sequence number is a maximum value in packet sequence numbers respectively corresponding to packets that belong to a first data flow and that are received by a receiving device through a first data channel between the sending device and the receiving device in a statistics period, the second packet sequence number is a maximum value in packet sequence numbers respectively corresponding to packets that belong to the first data flow and that are received by the receiving device through a second data channel between the sending device and the receiving device in the statistics period, at least one packet of the first data flow is sent on both the first data channel and the second data channel, and the packet sequence number is used to indicate a ranking sequence of a corresponding packet in the first data flow.

In an embodiment, there are two data channels between the sending device and the receiving device, and the two data channels are respectively referred to as the first data channel and the second data channel. The sending device separately sends the packet of the first data flow to the receiving device through the first data channel and the second data channel. In the statistics period, the receiving device receives the at least one packet of the first data flow through the first data channel. The maximum value in the packet sequence numbers is referred to as the first packet sequence number. The receiving device receives the at least one packet of the first data flow through the second data channel. The maximum value in the packet sequence numbers is referred to as the second packet sequence number.

Because factors such as bandwidths, congestion statuses, interference statuses, and negotiated communication rates of the two data channels are different, the first packet sequence number and the second packet sequence number may be different. If the first packet sequence number is greater than the second packet sequence number, it indicates that a speed of transmitting the packet of the first data flow through the first data channel is relatively high. In this case, the first data channel may be referred to as a fast data channel, and the second data channel may be referred to as a slow data channel. If the second packet sequence number is greater than the first packet sequence number, it indicates that a speed of transmitting the packet of the first data flow through the second data channel is relatively high. In this case, the second data channel may be referred to as a fast data channel, and the first data channel may be referred to as a slow data channel.

Optionally, all packets of the first data flow need to be sent on the first data channel and the second data channel.

The following uses an example for description.

It is assumed that packet sequence numbers of the packets of the first data flow are sequentially marked as 1, 2, . . . , 100, 101, . . . . All the packets of the first data flow need to be sent on the first data channel and the second data channel. In the current statistics period, the receiving device receives the packets 10 to 15 and the packets 17 to 20 through the first data channel, and receives the packets 15 to 31 and the packets 35 to 40 through the second data channel. In this case, the first packet sequence number is 20, and the second packet sequence number is 40. A speed of transmitting a packet of the first data flow through the second data channel is higher.

It should be noted that a specific value of the statistics period is not limited in an embodiment.

S502. The sending device updates packet cache queues and/or a packet cache queue of the first data channel and/or the second data channel based on the first packet sequence number and the second packet sequence number.

According to the data transmission method provided in an embodiment, at least one packet of a same data flow is transmitted through the two data channels, and a maximum value of packet sequence numbers of packets that are of the same data flow and that are separately received by the receiving device through the two data channels is periodically obtained, so that at least one of the packet cache queues of the first data channel and the second data channel can be updated based on the first packet sequence number and the second packet sequence number. Because the packet cache queue of the data channel is dynamically adjusted, data transmission efficiency and performance are improved, and a data transmission delay is reduced.

In an embodiment, that the sending device updates packet cache queues and/or a packet cache queue of the first data channel and/or the second data channel based on the first packet sequence number and the second packet sequence number in S502 may include:

If a difference between the first packet sequence number and the second packet sequence number is greater than a preset threshold, the sending device updates the packet cache queues and/or the packet cache queue of the first data channel and/or the second data channel based on the first packet sequence number and the second packet sequence number.

In an embodiment, the difference between the first packet sequence number and the second packet sequence number is an absolute value. If the first packet sequence number is greater than the second packet sequence number, the sending device determines whether a value obtained by subtracting the second packet sequence number from the first packet sequence number is greater than the preset threshold. If the first packet sequence number is less than the second packet sequence number, the sending device determines whether a value obtained by subtracting the first packet sequence number from the second packet sequence number is greater than the preset threshold. When the difference between the first packet sequence number and the second packet sequence number is large enough and is greater than the preset threshold, the sending device may update at least one of the packet cache queues of the first data channel and the second data channel.

The preset threshold is set, so that frequent update of the packet cache queue of the data channel is avoided, and data transmission efficiency and performance are improved.

It should be noted that a specific value of the preset threshold is not limited in an embodiment.

In another embodiment, that the sending device updates packet cache queues and/or a packet cache queue of the first data channel and/or the second data channel based on the first packet sequence number and the second packet sequence number in S502 may include:

If the first packet sequence number is greater than the second packet sequence number, the sending device deletes, from the packet cache queue of the second data channel, a packet that is in the first data flow and whose packet sequence number is less than or equal to the first packet sequence number.

If the second packet sequence number is greater than the first packet sequence number, the sending device deletes, from the packet cache queue of the first data channel, a packet that is in the first data flow and whose packet sequence number is less than or equal to the second packet sequence number.

In an embodiment, for a slow data channel, some unsent packets in a packet cache queue of the data channel have been received by the receiving device through the other fast data channel. Therefore, the packets in the packet cache queue of the slow data channel may be deleted, so that the two data channels are forcibly aligned, thereby avoiding sending of an invalid packet on the slow data channel. Synchronous sending on the two data channels reduces a packet transmission delay.

In still another embodiment, that the sending device updates packet cache queues and/or a packet cache queue of the first data channel and/or the second data channel based on the first packet sequence number and the second packet sequence number in S502 may include:

If the first packet sequence number is greater than the second packet sequence number, and there is a target packet in the packet cache queue of the second data channel, where a quantity of times that the sending device attempts to send the target packet on the first data channel reaches a preset maximum quantity of retransmissions, the sending device deletes, from the packet cache queue of the second data channel, a packet that is in the first data flow other than the target packet and whose packet sequence number is less than or equal to the first packet sequence number.

If the second packet sequence number is greater than the first packet sequence number, and there is a target packet in the packet cache queue of the first data channel, where a quantity of times that the sending device attempts to send the target packet on the first data channel reaches a preset maximum quantity of retransmissions, the sending device deletes, from the packet cache queue of the first data channel, a packet that is in the first data flow other than the target packet and whose packet sequence number is less than or equal to the second packet sequence number.

In an embodiment, the receiving device may or may not receive, through a data channel, a packet sent by the sending device. For a packet that is not received through a fast data channel, the sending device may resend the packet through the fast data channel. When a quantity of times that the sending device sends the packet through the fast data channel reaches a preset maximum quantity of retransmissions, the packet fails to be transmitted through the fast data channel. In this scenario, when a packet in a packet cache queue of a slow data channel is deleted, the packet that fails to be transmitted on the fast data channel is retained, so that the packet can continue to be sent on the slow data channel, thereby improving data transmission efficiency and reducing a packet loss rate.

It should be noted that, in an embodiment, when the first packet sequence number is compared with the second packet sequence number, a sequence number inverting problem needs to be noted.

In an embodiment, a packet sequence number is usually represented by a preset binary length, for example, 16 bits. After a packet is transmitted for a period of time, a sequence number of the packet may be inverted, for example, from 0xFFFF to 0. In this case, a value of the packet sequence number suddenly changes. Therefore, when the first packet sequence number is compared with the second packet sequence number, it needs to be determined whether sequence number inverting occurs.

For example, in a previous statistics period, the first packet sequence number and the second packet sequence number are 0xFFF0 and 0xFFD0 respectively. In the current statistics period, the first packet sequence number and the second packet sequence number are 0x0012 and 0xFFF2 respectively. Because a value of the first packet sequence number suddenly changes, when the first packet sequence number is compared with the second packet sequence number, the first packet sequence number is actually 0x0012+ 0xFFFF.

Optionally, that the sending device periodically obtains a first packet sequence number and a second packet sequence number in S501 may include:

For any data channel in the first data channel and the second data channel, in the statistics period, the sending device receives, through the data channel, an acknowledgement message sent by the receiving device. The acknowledgement message is used to indicate a packet received by the receiving device through the data channel.

The sending device obtains, based on the acknowledgement message, the packet sequence number indicating the received packet.

The sending device obtains the first packet sequence number or the second packet sequence number based on the packet sequence number indicating the received packet.

It should be noted that a meaning of the "acknowledgement message" herein is the same as that of the "feedback message" in the foregoing data receiving method in the application.

Compared with the acknowledgement message, an implementation of the acknowledgement message is different, and a manner of obtaining the packet sequence number based on the acknowledgement message is different.

In an embodiment, the acknowledgement message may be a group acknowledgement message. The group acknowledgement message may include a start WLAN frame sequence number and K bit indication information.

For the acknowledgement message and the group acknowledgement message, refer to related descriptions in the data receiving method in the application. Details are not described herein again.

That the sending device obtains, based on the acknowledgement message, a packet sequence number indicating the received packet may include:

The sending device obtains the packet sequence number of the packet based on the WLAN frame sequence number of the packet.

In an embodiment, the WLAN frame sequence number of the packet is a sequence number in a 802.11 frame that is determined according to the 802.11 protocol. There is a correspondence between the WLAN frame sequence number of the packet and the packet sequence number of the packet. The sending device stores the correspondence. Therefore, the sending device may obtain the packet sequence number of the packet based on the WLAN frame sequence number of the packet.

Optionally, the data transmission method provided in an embodiment may further include:

The sending device obtains, based on the acknowledgement message, a flow identifier indicating a data flow to which the received packet belongs.

That the sending device updates packet cache queues and/or a packet cache queue of the first data channel and/or the second data channel based on the first packet sequence number and the second packet sequence number may include:

When a flow identifier corresponding to the first packet sequence number is the same as a flow identifier corresponding to the second packet sequence number, the sending device updates the packet cache queues and/or the packet cache queue of the first data channel and/or the second data channel based on the first packet sequence number and the second packet sequence number.

In an embodiment, the receiving device receives packets through a data channel, and these packets may belong to different data flows. The sending device may obtain packet sequence numbers of a same data flow based on the acknowledgement message. Different data flows are distinguished between each other by using flow identifiers. When the flow identifier corresponding to the first packet sequence number is the same as the flow identifier corresponding to the second packet sequence number and is a flow identifier of the first data flow, the sending device updates at least one of the packet cache queues of the first data channel and the second data channel based on the first packet sequence number and the second packet sequence number.

Optionally, the data transmission method provided in an embodiment may further include:

The sending device obtains a to-be-sent packet.

If it is determined that the to-be-sent packet is sent on both the first data channel and the second data channel, the sending device separately places the to-be-sent packet in the packet cache queues of the first data channel and the second data channel.

In an embodiment, the sending device continuously obtains to-be-sent packets. For each to-be-sent packet, the sending device needs to determine whether the packet needs to be sent on both the first data channel and the second data channel. For a packet that needs to be sent on both the first data channel and the second data channel, the sending device separately places the packet in the packet cache queues of the first data channel and the second data channel.

Optionally, if there is one data flow to which the to-be-sent packet that is sent on both the first data channel and the second data channel belongs, that the sending device separately places the to-be-sent packet in the packet cache queues of the first data channel and the second data channel may include:

The sending device sets a priority of the to-be-sent packet to be higher than a priority of a packet of a data flow other than the data flow to which the to-be-sent packet belongs.

The sending device separately places the to-be-sent packet in the packet cache queues of the first data channel and the second data channel based on the priority of the to-be-sent packet.

In an embodiment, when there is one multi-transmit data flow, packets of the data flow may be set to have a highest priority, so that the packets of the data flow are placed in a same packet cache queue because of a highest priority, thereby facilitating subsequent update of the packet cache queue of the data channel, improving queue adjustment efficiency, and further improving data transmission efficiency and performance.

According to the data transmission method provided in an embodiment of the application, the sending device periodically obtains the first packet sequence number and the second packet sequence number. The sending device updates the packet cache queues and/or the packet cache queue of the first data channel and/or the second data channel based on the first packet sequence number and the second packet sequence number. According to the data transmission method provided in an embodiment, at least one of the packet cache queues of the first data channel and the second data channel may be dynamically adjusted based on the first packet sequence number and the second packet sequence number, to improve data transmission efficiency and performance and reduce a data transmission delay.

Figure 6:
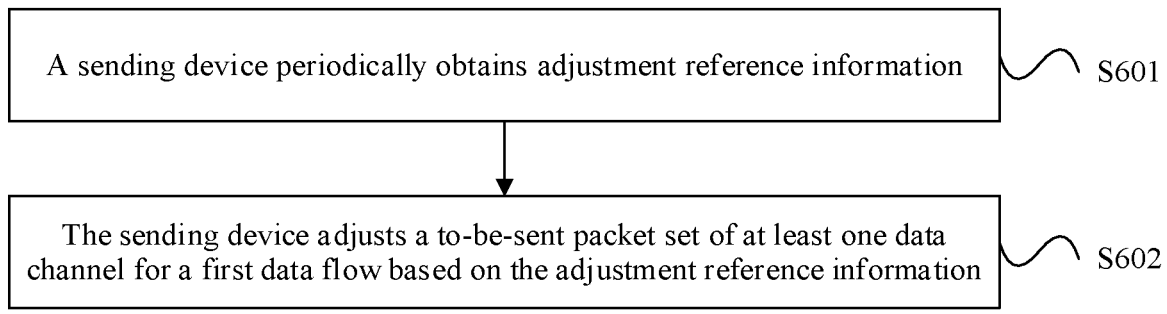
FIG. 6 is a flowchart of a data transmission method according to an embodiment 2 of the application.

FIG. 6 is a flowchart of a data transmission method according to an embodiment 2 of the application. The data transmission method provided in an embodiment may be executed by a sending device, and a packet sending set of a multi-transmit data flow on a data channel may be adjusted. A quantity of multi-transmit data flows is not limited in an embodiment. Any multi-transmit data flow may be referred to as a first data flow. As shown in FIG. 6, the data transmission method provided in an embodiment may include the following operations.

S601. The sending device periodically obtains adjustment reference information.

The adjustment reference information is used to indicate a congestion status of any one of two data channels between the sending device and a receiving device over which the sending device sends a packet, or is used to indicate a transmission rate of the first data flow sent by the sending device to the receiving device.

In an embodiment, in a data transmission process, a congestion status, an interference status, a signal quality status, and a to-be-sent service volume of sending the first data flow to the receiving device of the data channel change in real time. Therefore, the adjustment reference information is periodically obtained, so that a data sending status can be obtained in real time, thereby adjusting a data sending volume on the data channel in time.

In an embodiment, the adjustment reference information may indicate the congestion status of the data channel. A more congested data channel indicates a higher sending delay.

In another embodiment, the adjustment reference information may indicate the transmission rate of the first data flow sent to the receiving device. Optionally, the transmission rate of the first data flow sent by the sending device to the receiving device may include an average rate of first data flows that are received by the sending device from an upstream device in a statistics period, or an average rate of first data flows that are sent by the sending device to the receiving device in a statistics period. For example, as shown in FIG. 2A, the adjustment reference information may be an average rate of first data flows that are for different STAs and that are received by the HGW/AP from the server. A larger average rate indicates a larger data volume that needs to be sent to the receiving device for the STA and the first data flow.

It should be noted that a specific value of a period for obtaining the adjustment reference information is not limited in an embodiment, for example, 10 ms.

S602. The sending device adjusts a to-be-sent packet set of at least one data channel for the first data flow based on the adjustment reference information.

A union set of to-be-sent packet sets respectively corresponding to the two data channels is a first packet set, the first packet set includes all to-be-sent packets of the first data flow, and an intersection set of the to-be-sent packet sets respectively corresponding to the two data channels is non-empty.

In an embodiment, for a multi-transmit data flow, a to-be-sent packet set of the multi-transmit data flow on the at least one data channel may be adjusted based on the adjustment reference information. In the adjustment process, all packets of the multi-transmit data flow may be sent through the two data channels. In addition, at least one packet of the multi-transmit data flow needs to be sent on the two data channels.

According to the data transmission method provided in an embodiment, the adjustment reference information is periodically obtained, so that a data sending status can be obtained. Further, a to-be-sent packet set of a multi-transmit data flow on the at least one data channel may be adjusted based on the adjustment reference information, to improve data transmission adaptability, efficiency, and performance.

In an embodiment, the adjustment reference information may include an evaluation value corresponding to each data channel. The evaluation value may be any one of the following:

a queue utilization X of a queue corresponding to the first data flow;

a normalized value Y of the link delay, where the normalized value Y of the link delay is used to indicate a ratio of the link delay to a preset maximum link delay, and the link delay is a link delay of the data channel, a link delay of the queue corresponding to the first data flow on the data channel, or a link delay of the first data flow on the data channel; and $\alpha \times X + \beta \times Y$, where $\alpha$ is a weight value corresponding to the queue utilization, and $\beta$ is a weight value corresponding to the normalized value Y of the link delay.

In an embodiment, when a data channel is congested because of air interface interference, signal deterioration, or the like, both queue utilization and a link delay increase. These indicators may dynamically reflect a congestion status of the data channel. The sending device may evaluate congestion statuses of the two data channels based on indicators such as queue utilization and/or link delays respectively corresponding to the data channels, and for a data channel in a congested state, fewer packets can be sent.

The queue utilization X is obtained by measuring a queue corresponding to a multi-transmit data flow. For example, as shown in FIG. 4, the STA 1 is used as an example. If the queue corresponding to the multi-transmit data flow is the queue 1, the evaluation value is queue utilization of the queue 1.

The link delay may be obtained by measuring a data channel, a multi-transmit data flow, or a queue corresponding to the multi-transmit data flow. For example, as shown in FIG. 4, the first data channel and the STA 1 are used as an example. It is assumed that a queue corresponding to a multi-transmit data flow A is the queue 1. In this case, the link delay may be a link delay of the first data channel, a link delay of the multi-transmit data flow A on the first data channel, or a link delay of the queue 1 on the first data channel.

The normalized value Y of the link delay may be the ratio of the link delay to the preset maximum link delay. For example, the preset maximum link delay is 100 ms. The link delay is represented by Z. If $0 \leq Z \leq 100$ ms, $Y = (Z/100 \text{ ms}) \times 100\%$. If $Z > 100$ ms, $Y = 100\%$.

It should be noted that specific values of the preset link delay, $\alpha$, and $\beta$ are not limited in an embodiment.

It can be learned that values of X, Y, and $\alpha \times X + \beta \times Y$ range from 0 to 100%.

Optionally, that the sending device adjusts a to-be-sent packet set of at least one data channel for the first data flow based on the adjustment reference information in S602 may include:

For any one of evaluation values respectively corresponding to the two data channels, if the evaluation value is less than a first threshold, the sending device adjusts a to-be-sent packet set of a data channel corresponding to the evaluation value to the first packet set.

Alternatively, if the evaluation value is greater than the first threshold, the sending device adjusts, based on the evaluation value, a to-be-sent packet set of a data channel corresponding to the evaluation value.

In an embodiment, for each data channel, if an evaluation value corresponding to the data channel is less than the first threshold, it indicates that the data channel is not congested, and all packets of the first data flow can be sent on the data channel. If an evaluation value corresponding to the data channel is greater than the first threshold, it indicates that the data channel is congested. Because the evaluation value corresponding to the data channel ranges from 0 to 100%, a to-be-sent packet set of the data channel may be adjusted proportionally based on the evaluation value corresponding to the data channel.

For example, the evaluation value corresponding to the data channel is greater than the first threshold, and the evaluation value is 30%. In this case, a proportion of the to-be-sent packet set of the data channel to the first packet set may be adjusted to 30%. That is, 30% of all the packets of the first data flow are to be sent. It is assumed that the first data flow includes 100 packets, and the to-be-sent packets are sequentially marked as a packet 1 to a packet 30. In this case, packets 1 to 30, packets 71 to 100, packets 51 to 80, or the like may be sent through the data channel.

It should be noted that a specific value of the first threshold is not limited in an embodiment.

Optionally, that the sending device adjusts a to-be-sent packet set of at least one data channel for the first data flow based on the adjustment reference information in S602 may further include:

The sending device adjusts a to-be-sent packet set of one of the data channels to the first packet set.

In an implementation, it can be ensured that all the packets of the first data flow can be sent on one data channel. Usually, the data channel may be a data channel with a relatively high packet transmission speed.

In another embodiment, the adjustment reference information may include the transmission rate of the first data flow sent by the sending device to the receiving device.

In an embodiment, the adjustment reference information may reflect a status of a to-be-sent service volume of the first data flow sent to the receiving device and whether a service traffic burst occurs.

Optionally, that the sending device adjusts a to-be-sent packet set of at least one data channel for the first data flow based on the adjustment reference information in S602 may include:

The sending device adjusts the to-be-sent packet set of the first data channel to the first packet set.

Optionally, that the sending device adjusts a to-be-sent packet set of at least one data channel for the first data flow based on the adjustment reference information in S602 may include:

If the transmission rate is less than a second threshold, the sending device adjusts a to-be-sent packet set of a second data channel to the first packet set.

Alternatively, if the transmission rate is greater than the second threshold, the sending device adjusts a to-be-sent packet set of a second data channel based on a ratio of the second threshold to the adjustment reference information.

The second threshold is determined based on a rate of the second data channel that is negotiated between the receiving device and the sending device.

In an embodiment, the two data channels between the sending device and the receiving device may be a first data channel and a second data channel. It can be ensured that all the packets of the first data flow are sent on one (the first data channel) of the data channels, and a to-be-sent packet set of the other data channel (the second data channel) is adjusted based on the adjustment reference information. Optionally, if a packet transmission rate of the first data channel is higher, and a packet transmission rate of the second data channel is lower, it can be ensured that all the packets of the first data flow can be sent on the fast data channel, and only a to-be-sent packet set of the slow data channel is adjusted based on the adjustment reference information. When the transmission rate is less than the second threshold, it indicates that no data flow burst occurs. The sending device may send all the packets of the first data flow on the slow data channel. When the transmission rate is greater than the second threshold, it indicates that a data flow burst occurs. The sending device may adjust the to-be-sent packet set of the slow data channel proportionally based on the adjustment reference information. The proportion is the ratio of the adjustment reference information to the second threshold.

Optionally, the second threshold is less than or equal to a rate of the second data channel that is negotiated between the receiving device and the sending device.

It should be noted that a specific value of the second threshold is not limited in an embodiment.

For example, the negotiated rate of the second data channel is 50 Mbps/s, and the second threshold is equal to the negotiated rate and is also 50 Mbps/s. The transmission rate of the first data flow sent by the sending device to the receiving device is 100 Mbps/s. In this case, the sending device may adjust the to-be-sent packet set of the second data channel to 50% of the first packet set. That is, half of the packets of the first data flow are to be sent through the second data channel.

According to the data transmission method provided in an embodiment, the sending device periodically obtains the adjustment reference information. The sending device adjusts the to-be-sent packet set of the at least one data channel for the first data flow based on the adjustment reference information. According to the data transmission method provided in an embodiment, a to-be-sent packet set of a multi-transmit data flow on the at least one data channel is adjusted based on the adjustment reference information, to improve data transmission adaptability, efficiency, and performance.

The following uses an AP as an example to describe a software structure of a sending device or a receiving device according to an embodiment of the application.

Figure 7:
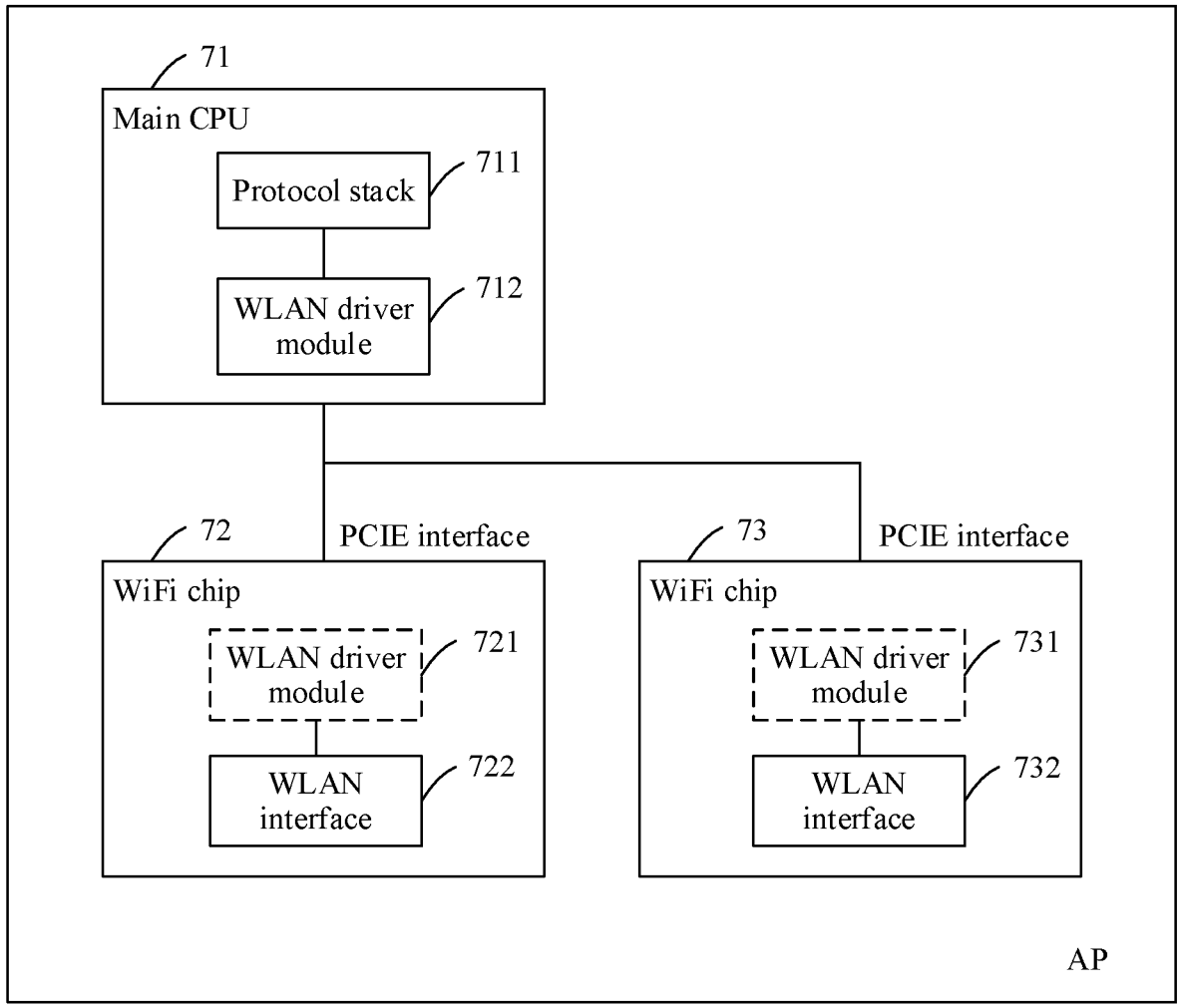
FIG. 7 is a schematic diagram of a software architecture of an AP according to an embodiment of the application.

FIG. 7 is a schematic diagram of a software architecture of an AP according to an embodiment of the application. The WLAN technology is used as an example for description.

As shown in FIG. 7, the software structure of the AP may include a protocol stack 711 and a WLAN driver module. The protocol stack 711 runs on a main CPU 71. The WLAN driver module may include a WLAN driver module 712 running on the main CPU 71. Optionally, the WLAN driver module may further include a WLAN driver module running on a WiFi chip, for example, a WLAN driver module 721 in a WiFi chip 72, or a WLAN driver module 731 in a WiFi chip 73.

The protocol stack 711 may be configured to: receive a packet sent by an uplink device (for example, an HGW), and forward the packet to the WLAN driver module. The WLAN driver module may be configured to process the packet according to the 802.11 protocol, and finally send the packet to a downlink device (for example, a STA) through the WLAN interface 722 and/or the WLAN interface 732. The WLAN driver module mainly runs on the main CPU 71, that is, the WLAN driver module 712. However, to alleviate processing load of the main CPU 71, a WLAN driver module, that is, the WLAN driver module 721 and the WLAN driver module 731, may also be disposed on the WiFi chip. Some WLAN driver functions (for example, frame aggregation, MAC-layer acknowledgement packet receiving and processing, and rate control) may be offloaded to the WiFi chip for execution.

It should be noted that, if a WLAN driver module is disposed on the WiFi chip, the WLAN driver module 721 and the WLAN driver module 731 usually cannot directly communicate with each other due to a communication frequency band or another reason. In this case, communication between the WLAN driver module 721 and the WLAN driver module 731 needs to be forwarded by the WLAN driver module 712 on the main CPU 71.

Optionally, the main CPU 71 is connected to the WiFi chip through a high-speed peripheral component interconnect express (PCIE) interface.

It should be noted that a quantity of WiFi chips is not limited in an embodiment.

Figure 8:
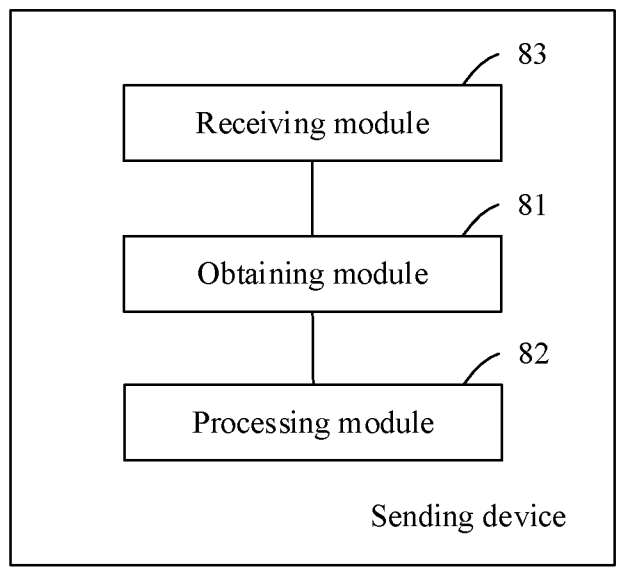
FIG. 8 is a schematic structural diagram of a sending device according to an embodiment 1 of the application.

FIG. 8 is a schematic structural diagram of a sending device according to an embodiment 1 of the application. The sending device provided in an embodiment is configured to perform the data transmission method provided in the embodiment shown in FIG. 5. As shown in FIG. 8, the sending device provided in an embodiment may include:

an obtaining module 81, configured to periodically obtain a first packet sequence number and a second packet sequence number, where the first packet sequence number is a maximum value in packet sequence numbers respectively corresponding to packets that belong to a first data flow and that are received by a receiving device through a first data channel between the sending device and the receiving device in a statistics period, the second packet sequence number is a maximum value in packet sequence numbers respectively corresponding to packets that belong to the first data flow and that are received by the receiving device through a second data channel between the sending device and the receiving device in the statistics period, at least one packet of the first data flow is sent on both the first data channel and the second data channel, and the packet sequence number is used to indicate a ranking sequence of a corresponding packet in the first data flow; and a processing module 82, configured to update packet cache queues and/or a packet cache queue of the first data channel and/or the second data channel based on the first packet sequence number and the second packet sequence number.

Optionally, the processing module 82 is configured to:

if a difference between the first packet sequence number and the second packet sequence number is greater than a preset threshold, update the packet cache queues and/or the packet cache queue of the first data channel and/or the second data channel based on the first packet sequence number and the second packet sequence number.

Optionally, the processing module 82 is configured to:

if the first packet sequence number is greater than the second packet sequence number, delete, from the packet cache queue of the second data channel, a packet that is in the first data flow and whose packet sequence number is less than or equal to the first packet sequence number.

Optionally, the processing module 82 is configured to:

if the first packet sequence number is greater than the second packet sequence number, and there is a target packet in the packet cache queue of the second data channel, where a quantity of times that the sending device attempts to send the target packet on the first data channel reaches a preset maximum quantity of retransmissions, delete, from the packet cache queue of the second data channel, a packet that is in the first data flow other than the target packet and whose packet sequence number is less than or equal to the first packet sequence number.

Optionally, the obtaining module 81 is configured to:

for any one of the first data channel and the second data channel, receive, in the statistics period through the data channel, an acknowledgement message sent by the receiving device, where the acknowledgement message is used to indicate a packet received by the receiving device through the data channel;

obtain, based on the acknowledgement message, a packet sequence number indicating the received packet; and obtain the first packet sequence number or the second packet sequence number based on the packet sequence number indicating the received packet.

Optionally, the obtaining module 81 is further configured to:

obtain, based on the acknowledgement message, a flow identifier indicating a data flow to which the received packet belongs; and the processing module 82 is configured to:

when a flow identifier corresponding to the first packet sequence number is the same as a flow identifier corresponding to the second packet sequence number, update the packet cache queues and/or the packet cache queue of the first data channel and/or the second data channel based on the first packet sequence number and the second packet sequence number.

Optionally, the first data channel is a first WLAN link, and the second data channel is a second WLAN link.

Optionally, the sending device further includes a receiving module 83.

The receiving module 83 is configured to obtain a to-be-sent packet.

The processing module 82 is further configured to: if it is determined that the to-be-sent packet is sent on both the first data channel and the second data channel, separately place the to-be-sent packet in the packet cache queues of the first data channel and the second data channel.

Optionally, if there is one data flow to which the to-be-sent packet that is sent on both the first data channel and the second data channel belongs, the processing module 82 is configured to:

set a priority of the to-be-sent packet to be higher than a priority of a packet of a data flow other than the data flow to which the to-be-sent packet belongs; and separately place the to-be-sent packet in the packet cache queues of the first data channel and the second data channel based on the priority of the to-be-sent packet.

It should be noted that, with reference to FIG. 7 and FIG. 8, the obtaining module 81 and the processing module 82 in an embodiment may be any one of the WLAN driver module 712, the driver module 721, and the driver module 731 in FIG. 7. The receiving module 83 may be the protocol stack 711 in FIG. 7.

The sending device provided in an embodiment is configured to perform the data transmission method provided in the embodiment shown in FIG. 5. A technical principle and a technical effect of the sending device are similar to those of the data transmission method, and details are not described herein again.

Figure 9:
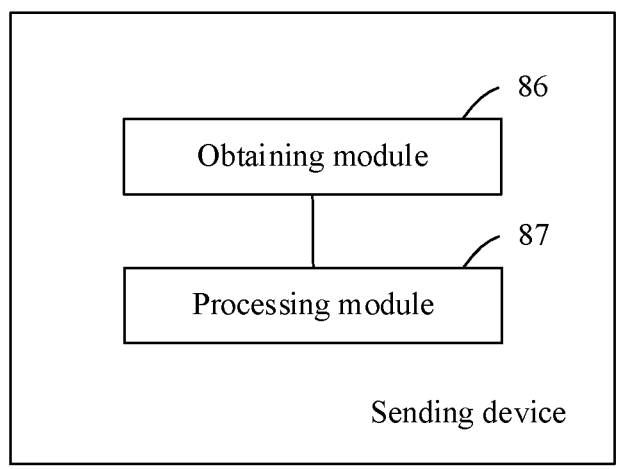
FIG. 9 is a schematic structural diagram of a sending device according to an embodiment 2 of the application.

FIG. 9 is a schematic structural diagram of a sending device according to Embodiment 2 of the application. The sending device provided in an embodiment is configured to perform the data transmission method provided in the embodiment shown in FIG. 6. As shown in FIG. 9, the sending device provided in an embodiment may include:

an obtaining module 86, configured to periodically obtain adjustment reference information, where the adjustment reference information is used to indicate a congestion status of any one of two data channels between the sending device and a receiving device over which the sending device sends a packet, or is used to indicate a transmission rate of a first data flow sent by the sending device to the receiving device; and a processing module 87, configured to adjust a to-be-sent packet set of at least one data channel for the first data flow based on the adjustment reference information, where a union set of to-be-sent packet sets respectively corresponding to the two data channels is a first packet set, the first packet set includes all to-be-sent packets of the first data flow, and an intersection set of the to-be-sent packet sets respectively corresponding to the two data channels is non-empty.

Optionally, the adjustment reference information includes an evaluation value corresponding to each data channel, and the evaluation value is any one of the following:

queue utilization X of a queue corresponding to the first data flow;

a normalized value Y of a link delay, where the normalized value Y of the link delay is used to indicate a ratio of the link delay to a preset maximum link delay, and the link delay is a link delay of the data channel, a link delay of a queue corresponding to the first data flow on the data channel, or a link delay of the first data flow on the data channel; and $\alpha \times X + \beta \times Y$, where $\alpha$ is a weight value corresponding to the queue utilization, and $\beta$ is a weight value corresponding to the normalized value Y of the link delay.

Optionally, the processing module 87 is configured to:

for any one of evaluation values respectively corresponding to the two data channels, if the evaluation value is less than a first threshold, adjust a to-be-sent packet set of a data channel corresponding to the evaluation value to the first packet set; or if the evaluation value is greater than the first threshold, adjust, based on the evaluation value, a to-be-sent packet set of a data channel corresponding to the evaluation value.

Optionally, the adjustment reference information includes the transmission rate of the first data flow sent by the sending device to the receiving device, and a to-be-sent packet set of a first data channel is the first packet set; and the processing module 87 is configured to:

if the transmission rate is less than a second threshold, adjust a to-be-sent packet set of a second data channel to the first packet set; or if the transmission rate is greater than the second threshold, adjust a to-be-sent packet set of a second data channel based on a ratio of the second threshold to the adjustment reference information.

The second threshold is determined based on a rate of the second data channel that is negotiated between the receiving device and the sending device.

It should be noted that, with reference to FIG. 7 and FIG. 9, the obtaining module 86 and the processing module 87 in an embodiment may be any one of the WLAN driver module 712, the driver module 721, and the driver module 731 in FIG. 7.

The sending device provided in an embodiment is configured to perform the data transmission method provided in the embodiment shown in FIG. 6. A technical principle and a technical effect of the sending device are similar to those of the data transmission method, and details are not described herein again.

Figure 10:
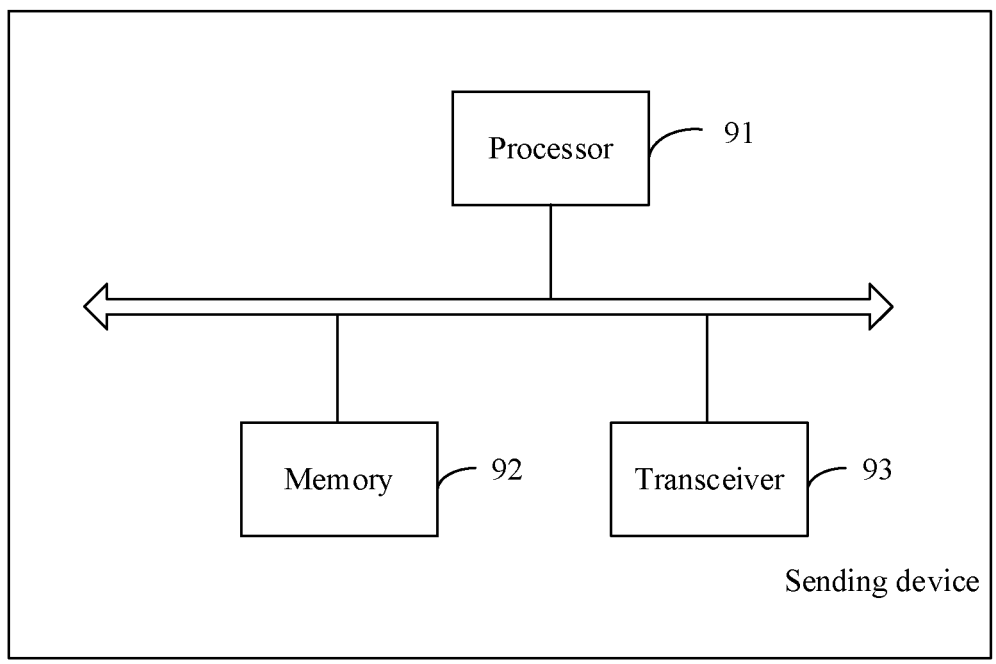
FIG. 10 is a schematic structural diagram of a sending device according to an embodiment 3 of the application.

FIG. 10 is a schematic structural diagram of a sending device according to Embodiment 3 of the application. As shown in FIG. 10, the sending device includes a processor 91, a memory 92, and a transceiver 93. The memory 92 is configured to store instructions. The transceiver 93 is configured to communicate with another device. The processor 91 is configured to execute the instructions stored in the memory 92, so that the sending device performs the data transmission method provided in the embodiment shown in FIG. 5 or FIG. 6. Specific implementations and technical effects are similar, and details are not described herein again.

It should be noted and understood that division of the modules of the foregoing apparatus is merely logic function division. During actual implementation, some or all modules may be integrated into one physical entity, or the modules may be physically separated. In addition, these modules may be all implemented in a form of software invoked by a processing element, or may be all implemented in a form of hardware. Alternatively, some modules may be implemented in a form of software invoked by a processing element, and some modules are implemented in a form of hardware. For example, a determining module may be a separately disposed processing element, or may be integrated in a chip of the foregoing apparatus for implementation. In addition, the determining module may alternatively be stored in a memory of the foregoing apparatus in a form of program code, and is invoked by a processing element of the foregoing apparatus to perform a function of the determining module. Implementations of other modules are similar. In addition, all or some of the modules may be integrated, or may be implemented independently. The processing element may be an integrated circuit and has a signal processing capability. In an implementation process, operations in the foregoing methods or the foregoing modules can be implemented by using a hardware integrated logical circuit in the processing element, or by using instructions in a form of software.

For example, the foregoing modules may be configured as one or more integrated circuits for implementing the foregoing method, such as one or more application-specific integrated circuits (ASIC), one or more microprocessors (for example, digital signal processor, DSP), or one or more field programmable gate arrays (FPGA). For another example, when one of the foregoing modules is implemented in a form of scheduling program code by a processing element, the processing element may be a general-purpose processor, for example, a central processing unit (CPU) or another processor that can invoke the program code. For still another example, the modules may be integrated together, and is implemented in a form of a system-on-a-chip (SOC).

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Optionally, an embodiment of the application further provides a storage medium. The storage medium stores instructions. When the instructions are run on a computer, the computer is enabled to perform the methods in the embodiments shown in FIG. 5 and FIG. 6.

Optionally, an embodiment of the application further provides a chip for running instructions. The chip is configured to perform the methods in the embodiments shown in FIG. 5 and FIG. 6.

An embodiment of the application further provides a program product. The program product includes a computer program, and the computer program is stored in a storage medium. At least one processor may read the computer program from the storage medium. When executing the computer program, the at least one processor may implement the methods in the embodiments shown in FIG. 5 and FIG. 6.

What is claimed is:
1. A data transmission method, comprising:
periodically obtaining, by a sending device, a first packet sequence number and a second packet sequence number, wherein:

the first packet sequence number is a maximum value in packet sequence numbers respectively corresponding to packets that belong to a first data flow and that are received by a receiving device through a first data channel between the sending device and the receiving device in a statistics period, the first data channel carrying at least one packet of the first data flow;

the second packet sequence number is a maximum value in packet sequence numbers respectively corresponding to packets that belong to the first data flow and that are received by the receiving device through a second data channel between the sending device and the receiving device in the statistics period, the second data channel carrying the at least one packet of the first data flow; and a ranking of the at least one packet of the first data flow is indicated by a packet sequence number; and updating, by the sending device, based on the first packet sequence number and the second packet sequence number, packet cache queues of the first data channel and the second data channel; or updating, by the sending device, based on the first packet sequence number and the second packet sequence number, a packet cache queue of the first data channel, or a packet cache queue of the second data channel.

2. The data transmission method according to claim 1, wherein the updating comprises:

if a difference between the first packet sequence number and the second packet sequence number is greater than a preset threshold, updating, by the sending device, based on the first packet sequence number and the second packet sequence number, the packet cache queues of the first data channel and the second data channel; or updating, by the sending device, based on the first packet sequence number and the second packet sequence number, the packet cache queue of the first data channel or the packet cache queue of the second data channel.

3. The data transmission method according to claim 1, wherein the updating comprises:

if the first packet sequence number is greater than the second packet sequence number, deleting, by the sending device from the packet cache queue of the second data channel, a packet that is in the first data flow and having the packet sequence number that is less than or equal to the first packet sequence number.

4. The data transmission method according to claim 1, wherein the updating comprises:

if the first packet sequence number is greater than the second packet sequence number, and there is a target packet in the packet cache queue of the second data channel, wherein a quantity of times that the sending device attempts to send the target packet on the first data channel reaches a preset maximum quantity of retransmissions, deleting, by the sending device from the packet cache queue of the second data channel, a packet that is in the first data flow other than the target packet and having the packet sequence number that is less than or equal to the first packet sequence number.

5. The data transmission method according to claim 1, wherein the periodically obtaining, by the sending device, the first packet sequence number and the second packet sequence number comprises:

for any one of the first data channel and the second data channel, receiving, by the sending device in the statistics period through a data channel, an acknowledgement message sent by the receiving device, wherein the acknowledgement message is used to indicate a packet received by the receiving device through the data channel;

obtaining, by the sending device based on the acknowledgement message, a packet sequence number indicating a received packet; and obtaining, by the sending device, the first packet sequence number or the second packet sequence number based on the packet sequence number indicating the received packet.

6. The data transmission method according to claim 5, further comprising:

obtaining, by the sending device based on the acknowledgement message, a flow identifier indicating a data flow to which the received packet belongs; and wherein the updating comprises:

when a flow identifier corresponding to the first packet sequence number is the same as a flow identifier corresponding to the second packet sequence number, updating, by the sending device, based on the first packet sequence number and the second packet sequence number, the packet cache queues of the first data channel and the second data channel; or updating, by the sending device, based on the first packet sequence number and the second packet sequence number, the packet cache queue of the first data channel or the packet cache queue of the second data channel.

7. The data transmission method according to claim 5, wherein the first data channel is a first wireless local area network (WLAN) link, and the second data channel is a second WLAN link.

8. The data transmission method according to claim 1, further comprising:

obtaining, by the sending device, a to-be-sent packet; and if it is determined that the to-be-sent packet is sent on both the first data channel and the second data channel, separately placing, by the sending device, the to-be-sent packet in the packet cache queues of the first data channel and the second data channel.

9. The data transmission method according to claim 8, wherein if there is one data flow to which the to-be-sent packet that is sent on both the first data channel and the second data channel belongs, the separately placing comprises:

setting, by the sending device, a priority of the to-be-sent packet to be higher than a priority of a packet of a data flow other than the data flow to which the to-be-sent packet belongs; and separately placing, by the sending device, the to-be-sent packet in the packet cache queues of the first data channel and the second data channel based on the priority of the to-be-sent packet.

10. A data transmission method, comprising:

periodically obtaining, by a sending device, adjustment reference information indicating a congestion status of any one of the two data channels over which a packet is sent, wherein the adjustment reference information comprises an evaluation value corresponding to each data channel, and the evaluation value is any one of the following:

queue utilization X of a queue corresponding to a first data flow;

a normalized value Y of a link delay, wherein the normalized value Y of the link delay is used to indicate a ratio of the link delay to a preset maximum link delay, and the link delay is a link delay of the data channel, a link delay of the queue corresponding to the first data flow on the data channel, or a link delay of the first data flow on the data channel; and α×X+β×Y, wherein α is a weight value corresponding to the queue utilization, and β is a weight value corresponding to the normalized value Y of the link delay; and adjusting, by the sending device, a to-be-sent packet set of at least one of the two data channels between the sending device and a receiving device for the first data flow based on the adjustment reference information, wherein a union set of to-be-sent packet sets respectively corresponding to the two data channels is a first packet set, the first packet set comprises all to-be-sent packets of the first data flow, and an intersection set of the to-be-sent packet sets respectively corresponding to the two data channels is non-empty.

11. The data transmission method according to claim 10, wherein the adjusting comprises:

for any one of evaluation values respectively corresponding to the two data channels, if the evaluation value is less than a first threshold, adjusting, by the sending device, a to-be-sent packet set of a data channel corresponding to the evaluation value to the first packet set; or if the evaluation value is greater than the first threshold, adjusting, by the sending device based on the evaluation value, a to-be-sent packet set of a data channel corresponding to the evaluation value.

12. The data transmission method according to claim 10, wherein the adjustment reference information is used to indicate a transmission rate of the first data flow sent by the sending device to the receiving device.

13. The data transmission method according to claim 12, wherein the adjustment reference information comprises the transmission rate of the first data flow sent by the sending device to the receiving device, and a to-be-sent packet set of a first data channel is the first packet set; and the adjusting comprises:

if the transmission rate is less than a second threshold, adjusting, by the sending device, a to-be-sent packet set of a second data channel to the first packet set; or if the transmission rate is greater than the second threshold, adjusting, by the sending device, the to-be-sent packet set of the second data channel based on a ratio of the second threshold to the adjustment reference information, wherein the second threshold is determined based on a rate of the second data channel that is negotiated between the receiving device and the sending device.

14. A sending device, comprising:

a memory; and one or more processors coupled with the memory, wherein the one or more processors are configured to:

periodically obtain a first packet sequence number and a second packet sequence number, wherein:

the first packet sequence number is a maximum value in packet sequence numbers respectively corresponding to packets that belong to a first data flow and that are received by a receiving device through a first data channel between the sending device and the receiving device in a statistics period, the first data channel carrying at least one packet of the first data flow;

the second packet sequence number is a maximum value in packet sequence numbers respectively corresponding to packets that belong to the first data flow and that are received by the receiving device through a second data channel between the sending device and the receiving device in the statistics period, the second data channel carrying the at least one packet of the first data flow; and a ranking of the at least one packet in the first data flow is indicated by a packet sequence number; and update, based on the first packet sequence number and the second packet sequence number, packet cache queues of the first data channel and the second data channel; or updating, based on the first packet sequence number and the second packet sequence number, a packet cache queue of the first data channel or a packet cache queue of the second data channel.

15. The sending device according to claim 14, wherein the one or more processors are further configured to:

if a difference between the first packet sequence number and the second packet sequence number is greater than a preset threshold, update, based on the first packet sequence number and the second packet sequence number, the packet cache queues of the first data channel and the second data channel; or update, by the sending device, based on the first packet sequence number and the second packet sequence number, a packet cache queue of the first data channel or a packet cache queue of the second data channel.

16. The sending device according to claim 14, wherein the one or more processors are further configured to:

if the first packet sequence number is greater than the second packet sequence number, delete, from a packet cache queue of the second data channel, a packet that is in the first data flow and having the packet sequence number that is less than or equal to the first packet sequence number.

17. The sending device according to claim 14, wherein the one or more processors are further configured to:

for any one of the first data channel and the second data channel, receive, in the statistics period through a data channel, an acknowledgement message sent by the receiving device, wherein the acknowledgement message is used to indicate a packet received by the receiving device through the data channel;

obtain, based on the acknowledgement message, a packet sequence number indicating a received packet; and obtain the first packet sequence number or the second packet sequence number based on the packet sequence number indicating the received packet.

18. The sending device according to claim 17, wherein the first data channel is a first wireless local area network WLAN link, and the second data channel is a second WLAN link.

* * * * *